United States Patent
Kavathekar

(10) Patent No.: US 11,050,581 B1
(45) Date of Patent: Jun. 29, 2021

(54) ADAPTIVE SUPERVISION SIGNALS

(71) Applicant: Alarm.com Incorporated, Tysons, VA (US)

(72) Inventor: Paritosh Anil Kavathekar, Reston, VA (US)

(73) Assignee: Alarm.com Incorporated, Tysons, VA (US)

( * ) Notice: Subject to any disclaimer, the term of this patent is extended or adjusted under 35 U.S.C. 154(b) by 495 days.

(21) Appl. No.: 15/916,686

(22) Filed: Mar. 9, 2018

Related U.S. Application Data

(60) Provisional application No. 62/471,476, filed on Mar. 15, 2017.

(51) Int. Cl.
*H04L 12/28* (2006.01)

(52) U.S. Cl.
CPC ........ *H04L 12/2825* (2013.01); *H04L 12/282* (2013.01); *G05B 2219/2642* (2013.01); *H04L 2012/2845* (2013.01)

(58) Field of Classification Search
CPC .............. H04L 12/2825; H04L 12/282; G05B 2219/2642
See application file for complete search history.

(56) References Cited

U.S. PATENT DOCUMENTS

| | | | |
|---|---|---|---|
| 9,704,393 B2 | 7/2017 | Acharya et al. | |
| 9,886,839 B2 | 2/2018 | Martin | |
| 10,200,272 B1 | 2/2019 | Trundle | |
| 2007/0146127 A1* | 6/2007 | Stilp | G08B 1/08 340/531 |
| 2013/0300564 A1* | 11/2013 | Lamb | G08B 25/008 340/573.4 |
| 2015/0188725 A1* | 7/2015 | Coles | G08B 25/008 700/90 |
| 2015/0323915 A1* | 11/2015 | Warren | H04L 12/2803 700/275 |
| 2016/0286169 A1* | 9/2016 | Sannala | H04N 5/33 |
| 2018/0144615 A1* | 5/2018 | Kinney | G08B 13/19695 |
| 2019/0043326 A1 | 2/2019 | Madden et al. | |

\* cited by examiner

*Primary Examiner* — Regis J Betsch
*Assistant Examiner* — Jeremy A Delozier
(74) *Attorney, Agent, or Firm* — Fish & Richardson P.C.

(57) ABSTRACT

Systems and techniques are described for dynamically configuring and/or adjusting intervals for exchanging supervision signals between a control panel and an associated server system of a monitoring system located in a property. In some implementations, sensor data generated by one or more sensors of a monitoring system is obtained. A status of the property is determined based on the sensor data. A pinging frequency of the monitoring system is adjusted based on the status of the property. The pinging frequency specifies a frequency of communications between the server system and the control unit. The control unit is then configured to communicate with the server system according to the adjusted pinging frequency.

18 Claims, 6 Drawing Sheets

200

```
OBTAIN DATA ASSOCIATED WITH A MONITORING SYSTEM THAT MONITORS
A PROPERTY
                                                                    210
```

```
DETERMINE A MONITORING SYSTEM STATUS
                                                                    220
```

```
DETERMINE A PARTICULAR PING FREQUENCY FOR THE MONITORING
SYSTEM THAT SPECIFIES A NUMBER OF TIMES IN A PERIOD THAT THE
MONITORING SYSTEM COMMUNICATES WITH A SERVER          230
```

```
TRANSMIT AN INSTRUCTION TO ADJUST A CURRENT PING FREQUENCY TO
THE PARTICULAR PING FREQUENCY
                                                                    240
```

ADAPTIVE SUPERVISION SIGNALS

CROSS-REFERENCE TO RELATED APPLICATIONS

This application claims the benefit of U.S. Provisional Patent Application No. 62/471,476, filed on Mar. 15, 2017 and titled "ADAPTIVE SUPERVISION SIGNALS," which is incorporated herein by reference in its entirety.

TECHNICAL FIELD

This disclosure relates to home monitoring technology.

BACKGROUND

Monitoring systems often include a feature where a receiver (e.g., a control panel) and an associated transmitter (e.g., a monitoring system server) periodically exchange supervision signals. The supervision signals provide various types of status information associated with the control panel, for example, connectivity status, detected events, among others. In addition, the supervision signals are often transmitted at fixed interval of time based on the configuration of the monitoring system.

SUMMARY

Fixed interval data transmissions can often impose performance burdens on a property monitoring system. For example, a short interval results in a high number of transmissions between a control panel and a server system. This can cause unnecessary transmissions, limit the processing resources of the control panel and the server systems, and/or increase the likelihood of transmission errors. A long interval, on the other hand, can often limit the transmission of data indicating an emergency condition detected at a property. However, because property conditions often periodically change over time, e.g., based on a time of day, based on a season, based on occupancy/usage, fixed intervals often fail to reflect the shifting data transmission needs of a property monitoring system.

In some implementations, a system is capable of dynamically configuring and/or adjusting intervals for exchanging supervision signals between a control panel and an associated server system. For instance, the system has a configurable ping frequency that can be adjusted based on, for example, detected changes in system status. The system periodically monitors the system status and adjusts the ping frequency that best suits the transmissions standards for the determined statue for the property.

In general, the architecture of the system enables various components of to dynamically adjust the pinging frequency based on obtained status data. For examples, in some implementations, the system adjusts the pinging frequency based on a determined status for the system or the property where the system is located (e.g. data indicating that the property is presently occupied). In other implementations, the system adjusts the pinging frequency for based data obtained from monitoring systems of nearby properties (e.g., data indicating a detected power outage at nearby properties). In some implementations, the system adjusts the pinging frequency based on a combination of obtained data.

In one general aspect, a computer-implemented method may include: obtaining data associated with a monitoring system that monitors a property; determining a monitoring system status based on the obtained data associated with the monitoring system; based on the determined monitoring system status, determining, for the monitoring system, a particular pinging frequency that specifies a number of times in a period that the monitoring system communicates with a server; and transmitting an instruction to adjust a current pinging frequency for the monitoring system to the particular pinging frequency determined for the monitoring system.

Implementations of the described techniques may include hardware, a method or process implemented at least partially in hardware, or a computer-readable storage medium encoded with executable instructions that, when executed by a processor, perform operations.

The details of one or more implementations are set forth in the accompanying drawings and the description below. Other features will be apparent from the description and drawings.

DESCRIPTION OF DRAWINGS

FIG. 2 illustrates an example of a process for adjusting a pinging frequency of a monitoring system.

In the drawings, like reference numbers represent corresponding parts throughout.

DETAILED DESCRIPTION

In general, techniques are described for automating aspects of the property condition monitoring process to enable a property management company to efficiently determine a present property condition, and perform various actions associated with the determined property condition. For instance, a system may initially determine a baseline (or initial) condition for a property prior to an occupant (e.g., a renter, a tenant) obtaining possession over the property. Once the occupant has vacated the property premises, the system may determine a present (or updated) condition for the property. The system may collect various types of data and/or information associated with the baseline and present conditions, which can then be compared manually or automatically to identify a set of maintenance-related operations to be performed at the property.

As described throughout, a "status" refers to a determined indicator associated with a monitoring system of a property or a determined condition of the property. For instance, a status can represent the alarm status of a monitoring system (e.g., "ARMED," "UNARMED," "STAY"). In another example, the status can represent whether a property is currently occupied or unoccupied. As described in greater detail below, a status can be determined based on, for example, data collected by sensors of a monitoring system within a property, data obtained from monitoring systems of nearby properties, external data obtained by a server system, or a combination thereof.

In some implementations, statuses may be determined for different components of a monitoring system. For example, different statuses may be determined for a control unit, associated sensors, one or more network operations centers, and/or a server system. In addition, an overall status can be determined for the entire monitoring system based on aggregating the statuses for the individual components of the monitoring system.

In some implementations, statuses may be determined for a network of monitoring systems (e.g., monitoring systems of properties located within a specified geographic region). For example, different statuses may be determined for each monitoring system within the network, as well as an overall status for the specified geographic region based on aggregating the statuses for the monitoring systems for the properties that are located within the specified geographic region.

Figure 1:
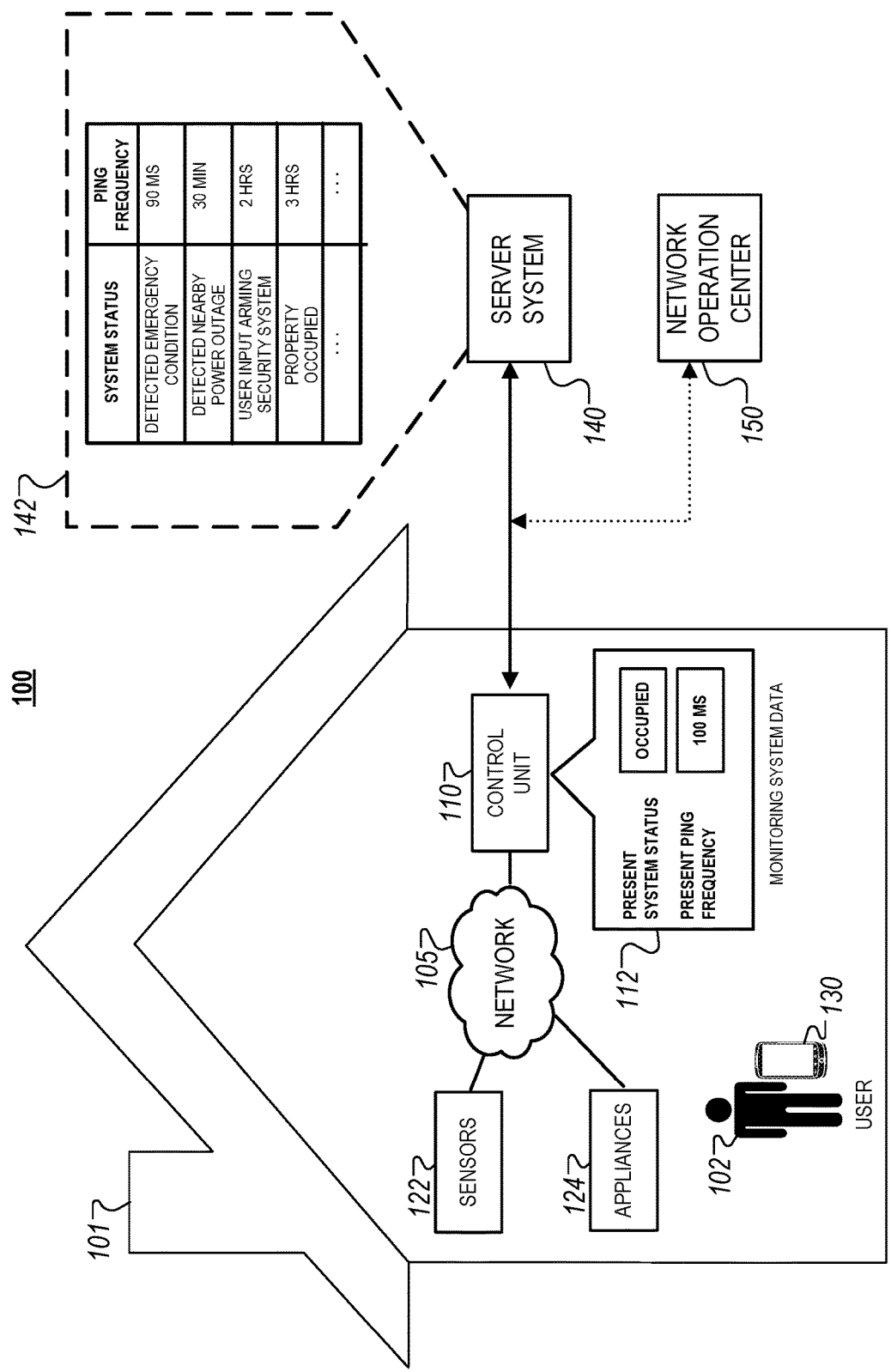
FIG. 1 illustrates an example of a system that is capable of dynamically adjusting its pinging frequency

FIG. 1 illustrates an example of a system that is capable of dynamically adjusting its pinging frequency. The system 100 includes a control unit 110, sensors 122, appliances 124, a user device 130, and a server system 140 connected over a network 105 within a property 101. The user device 130 can be associated with a user 102 such as an occupant of the property 101 such as a temporary resident, a tenant, a property manager or a property owner. The server system 140 further includes a repository 142 for storing status information associated with different pinging frequencies of the system 100.

In general, the system 100 can dynamically adjust the transmission of supervision signals between components based on adjusting a pinging frequency of transmission. The system 100 initially determines a monitoring system status based on processing various types of collected data. For example, the system 100 determines the monitoring system status based on processing data collected by one or more of the control unit 110, the sensors 122, the appliances 124, the user device 130, or the server system 140. The system 100 identifies an appropriate pinging frequency that corresponds to the determined monitoring system status. The system 100 then generates an instruction to configure the transmitting and receiving components (e.g., the control unit 110 and the server system 140) to transmit supervision signals according to the identified pinging frequency.

In the example illustrated in FIG. 1, the control unit 110 obtains initially obtains data from the sensors 122, the appliances 124 and the user device 130. The obtained data is used to generate monitoring system data 112, which includes a present system status based on a detected occupancy of the property 101 and a present pinging frequency of 100 milliseconds (e.g., a current pinging frequency for transmitting supervision signals to the server system 140). The server system 140 determines an appropriate pinging frequency within the repository 142 based on the present system status (e.g., a pinging frequency of 3 hours). The configuration of the server system 140 and the control unit 110 are then changed to adjust the pinging frequency from 100 milliseconds to three hours. In this example, the pinging frequency is decreased because the property 101 is presently occupied by the user 102, which decreases the likelihood that system 100 requires persistent monitoring by the server system 140.

In other examples, the present system status determined for the system 100 can additionally or alternatively based on other types of monitoring system data. For example, as shown in the repository 142, the status can be based on a detected emergency condition within the property 101, a detection of a specified event at nearby properties (e.g., a detected power outage within a geographic region), or user input data by the user 102 received on the user device 130 (e.g., a user input to arm the security system of the property 101). Each of these examples are associated with a corresponding pinging frequency that adjusts the transmission of supervision signals based on a property condition associated with the system status. For example, the pinging frequency for a detected emergency condition is higher than a pinging frequency for an occupied property because the former may be a life-critical condition that requires real-time or near real-time data transmissions between the control unit 110 and the server system 140. In the second example, the pinging frequency for an occupied property without a detected emergency condition may be lower because of a lower likelihood that a particular data transmission between the control unit 110 and the server system 140 includes life-critical (or otherwise necessary) monitoring system data.

In some implementations, the system 100 may use a prioritization scheme to select an appropriate pinging frequency if two or more system statuses are determined to reflect a present property condition. For example, in such implementations, the repository 142 may specify an order to select a pinging frequency for multiple system statuses based on the severity of the property condition associated with a system status (e.g., a detected emergency condition having a higher prioritization than an occupied property). In this example, the system 100 may select a pinging frequency of 90 milliseconds for a property that is determined to have a detected emergency condition and also be presently occupied. In other examples, the system 100 may combine the respective pinging frequencies for the multiple system statuses (e.g., selecting an average of two pinging frequencies).

Referring now to the components of system 100, the network 105 is configured to enable exchange of electronic communications between devices connected to the network 105. For example, the network 105 may be configured to enable exchange of electronic communications between the control unit 110, the sensors 122, the appliances 124, the user device 130, and the server system 140.

The network 105 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 105 may include multiple networks or subnetworks, each of which may include, for example, a wired or wireless data pathway.

The network 105 may include a circuit-switched network, a packet-switched data network, or any other network able to carry electronic communications (e.g., data or voice communications). For example, the network 105 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 105 may include one or more networks that include wireless data channels and wireless voice channels. The network 105 may be a wireless network, a broadband network, or a combination of networks including a wireless network and a broadband network.

The control unit 110 includes a controller and a network module. The controller is configured to control a monitoring system (e.g., a home alarm or security system). In some examples, the controller may include a processor or other control circuitry configured to execute instructions of a program that controls operation of an alarm system. In these examples, the controller may be configured to receive input from sensors, detectors, or other devices included in the alarm system and control operations of devices included in the alarm system or other household devices (e.g., a thermostat, an appliance, lights, etc.).

The network module is a communication device configured to exchange communications over the network 105. The network module may be a wireless communication module configured to exchange wireless communications over the network 105. For example, the network module may be a wireless communication device configured to exchange communications over a wireless data channel and a wireless voice channel. In this example, the network module may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module also may be a wired communication module configured to exchange communications over the network 105 using a wired connection. For instance, the network module may be a modem, a network interface card, or another type of network interface device. The network module may be an Ethernet network card configured to enable the control unit 110 to communicate over a local area network and/or the Internet. The network module also may be a voice band modem configured to enable the alarm panel to communicate over the telephone lines of Plain Old Telephone Systems (POTS).

The control unit 110 may store sensor and image data received from the system 100 and perform analysis of sensor and image data received from the system 100. Based on the analysis, the control unit 110 may communicate with, and control aspects of, the sensors 122, the appliances 124, or the user device 130. In addition, the control unit 110 may store dynamic object data (e.g., based on sensor data collected by the sensors 122), or information associated with dynamic object data (e.g., historical status information associated with dynamic objects). The control unit 110 may also store data associated with the dynamic multi-dimensional spatial representations that are determined for the property 101. For example, the control unit 110 may store historical data associated with previously generated spatial representations of the property 101 over a specified period of time.

The system 100 also includes one or more sensors or detectors. For example, the system 100 may include multiple sensors 122. The sensors 122 may include a contact sensor, a motion sensor, a glass break sensor, or any other type of sensor included in an alarm system or security system. The sensors 122 also may include an environmental sensor, such as a temperature sensor, a water sensor, a rain sensor, a wind sensor, a light sensor, a smoke detector, a carbon monoxide detector, an air quality sensor, etc. The sensors 122 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors 122 may include a radio-frequency identification (RFID) sensor that identifies a particular article that includes a pre-assigned RFID tag.

In some implementations, the sensors 122 may include one or more cameras. The cameras may be video/photographic cameras or other type of optical sensing devices configured to capture images. For instance, the cameras may be configured to capture images of an area within a building monitored by the control unit 110. The cameras may be configured to capture single, static images of the area and also video images of the area in which multiple images of the area are captured at a relatively high frequency (e.g., thirty images per second). The cameras may be controlled based on commands received from the control unit 110.

The appliances 124 may be home automation devices connected to the network 105 that are configured to exchange electronic communications with other devices of the system 100. The appliances 124 may include, for example, connected kitchen appliances, controllable light sources, safety and security devices, energy management devices, and/or other types of electronic devices capable of exchanging electronic communications over the network 105. In some instances, the appliances 124 may periodically transmit information and/or generated data to the control unit 110 such that the control unit 110 can automatically control the operation of the appliances 124 based on the exchanged communications. For example, the control unit 110 may operate one or more of the appliances 124 based on a fixed schedule specified by the user. In another example, the control unit 110 may enable or disable one or more of the appliances 124 based on received sensor data from the sensors 122.

The user device 130 may be any type of personal electronic computing device that is associated with a property management company that operates the server system 140. The user device 130 may be one or more of a cellular telephone, smartphone, a tablet-computing device, a laptop computing device, a desktop computing device, a wearable device, or any other type of network-enabled electronic device.

The user device 130 may include a native application that enables communications with devices located within the property 101 through the server system 140. The native application refers to software/firmware programs running on the user device 130 that enable various features. For instance, the user device 130 may load or install the native application based on data received over a network 105 or data received from local media. The native application may run on various mobile device platforms associated with the user device 130.

In some implementations, the native application of the user device 130 identifies a geographic location associated with the user device 130 and communicates information identifying the geographic location. For example, the user device 130 having the native application may determine a geographic location of the user device 130 using GPS capabilities, and may communicate data identifying the geographic location to the server system 140. In some instances, the native application may check the location of the user device 130 periodically and may detect when a user is presently located inside or outside a property.

Additionally, or alternatively, the user device 130 may communicate with the control unit 110, the sensors 122, and/or the appliances 124 using various local wireless protocols, such as Wi-Fi, Bluetooth, Z-Wave, ZigBee, Home Plug, HPAV, HPAV2, G.hn (Ethernet over power line), or wired protocols such as Ethernet, USB, and other wired protocols based on the RS232, RS485, and/or RS422 standards.

The server system 140 may be an electronic device configured to provide monitoring services for the property 101. The server system 140 may exchange electronic communications with the control unit 110, the sensors 122, the appliances 124, and the user device 130 over the network 105. For example, the server system 140 may obtain and store the property condition data 112 within the repository 152 to maintain a historical rental and/or maintenance record associated with the property 101.

In some implementations, the server system 140 is operated and/or maintained by, for example, a property management company that manages property rentals for multiple properties including the property 101. For example, the server system 140 may be associated with rental management system (e.g., through a web page or through a mobile application) that enables prospective occupants to make a rental selection of a property that is made available by the property management company. In such implementations, the user 102 can be an employee of the rental management company that inspects and/or performs an inspection of the property 101 prior to the start of a rental period, or after the termination of a rental period.

Alternatively, in other implementations, the server system 140 may instead by operated and/or maintained by a third party that is distinct from the property management company but otherwise has access to rental data associated with the property 101 (e.g., data included within the repository 152). In such implementations, the server system 140 may obtain property information from a system of the property management company for storage within the repository 152.

The server system 140 may be configured to monitor events (e.g., alarm events, emergency conditions, etc.) generated by the control unit 110, the sensors 122, and/or the appliances 124. For example, the server system 140 may exchange electronic communications with the network module included in the control unit 110 to receive information regarding events (e.g., fire, carbon monoxide) detected by the control unit 110. The server system 140 also may receive information regarding events (e.g., alarm events) from the control unit 110.

The server system 140 may also store sensor and image data received from the system 100 and perform analysis of sensor and image data received from the system 100. Based on the analysis, the server system 140 may communicate with and control aspects of the control unit 110, the sensors 122, the appliances 124, or the user device 130. In addition, the server system 140 may store dynamic object data (e.g., based on sensor data collected by the sensors 122), or information associated with dynamic object data (e.g., historical status information associated with dynamic objects). The server system 140 may also store data associated with the dynamic multi-dimensional spatial representations that are determined for the property 101. For example, the server system 140 may store historical data associated with previously generated spatial representations of the property 101 over a specified period of time.

Figure 3A:
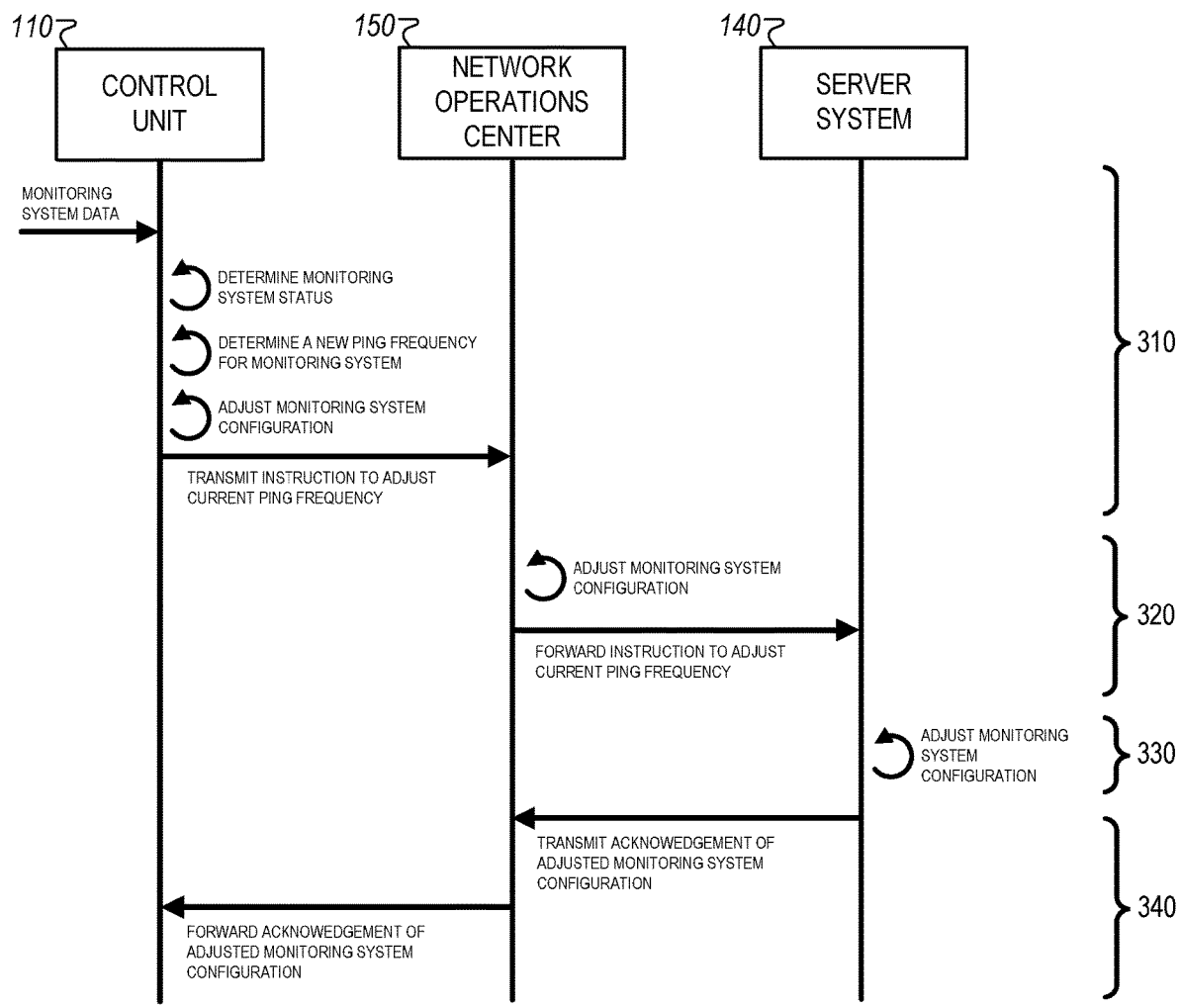
FIGS. 3A-3C illustrates transmission sequences for adjusting a pinging frequency of a monitoring system.
Figure 3B:
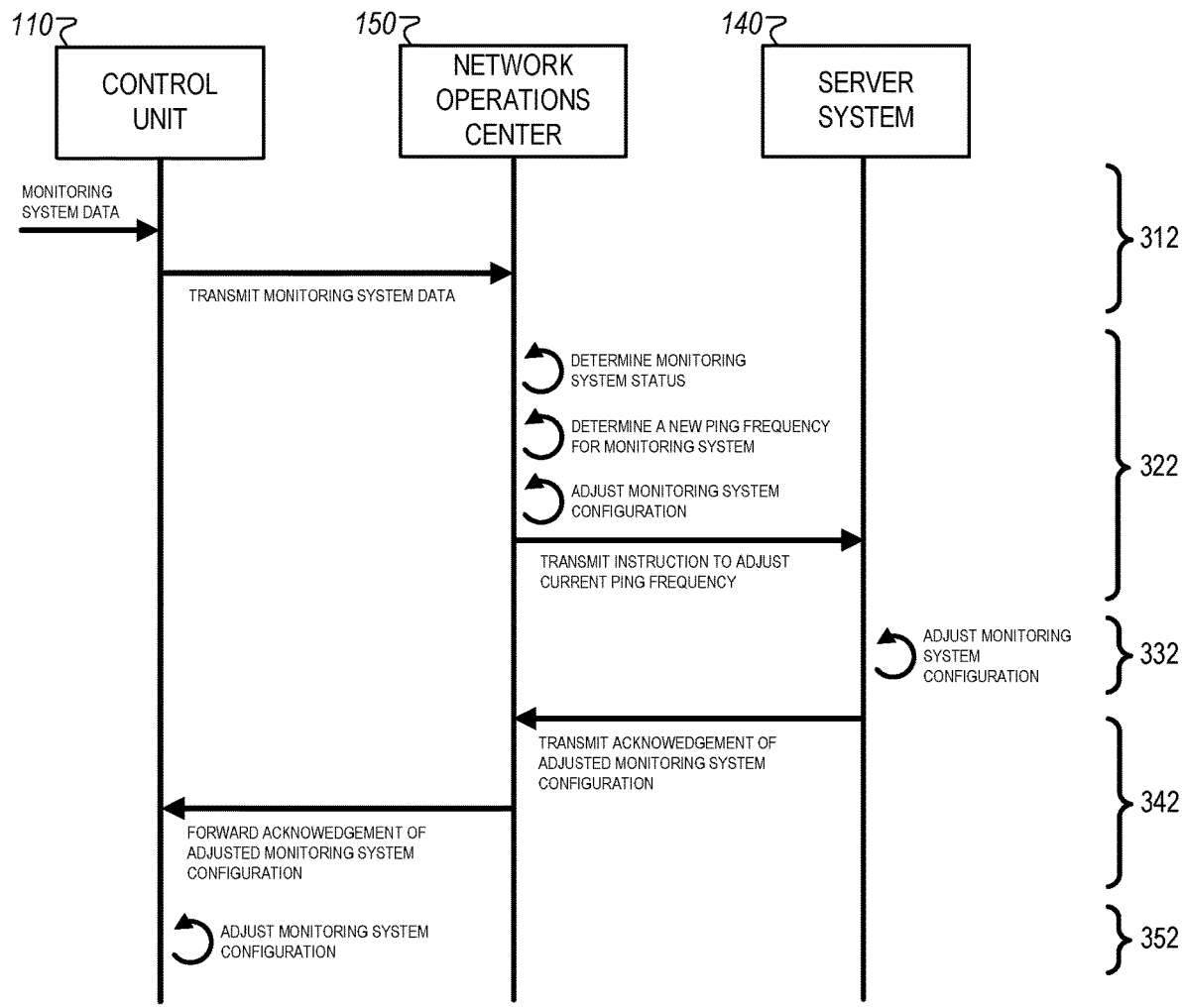
Figure 3C:
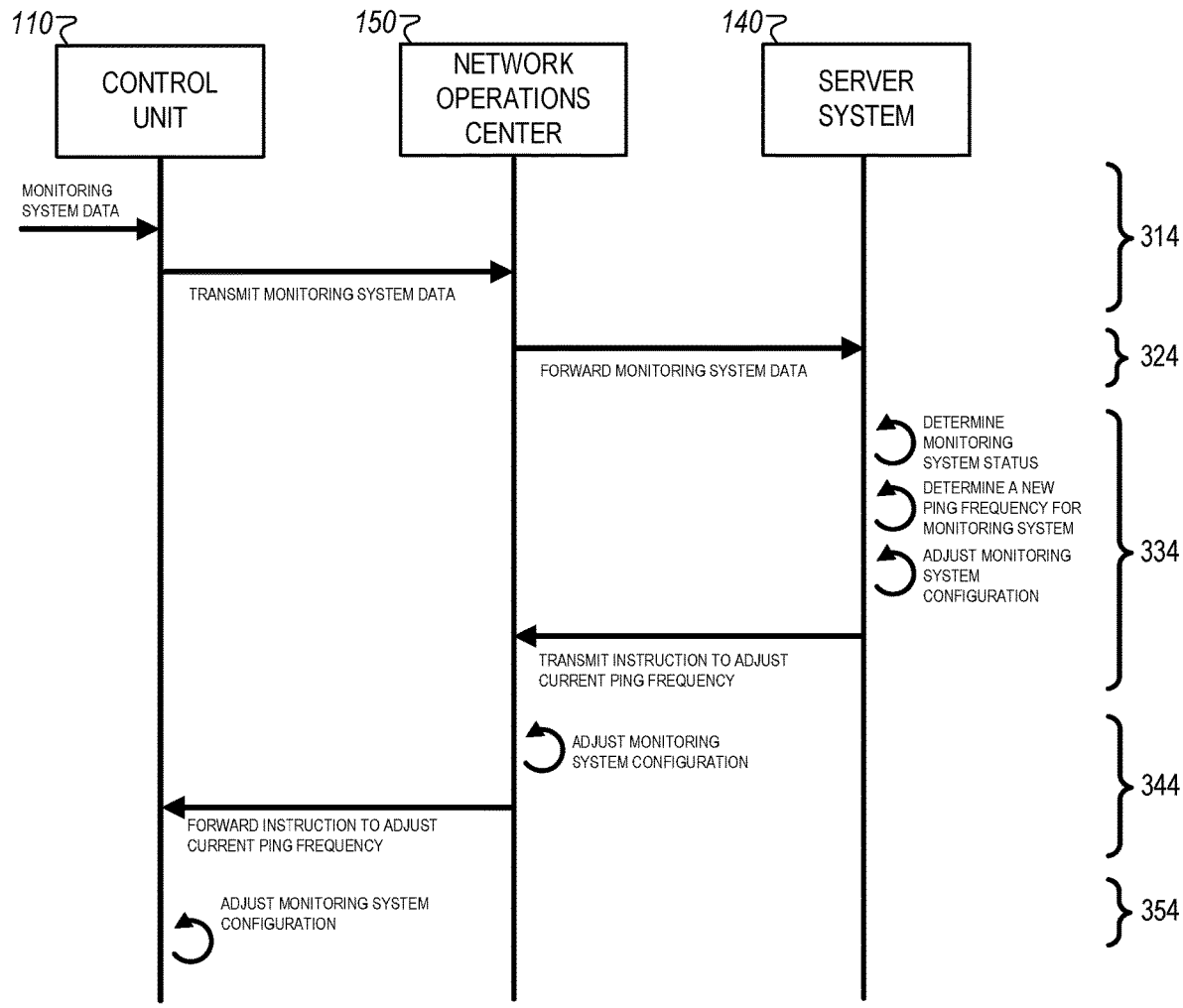

In some implementations, the system 100 may additionally include a network operations center (NOC) (e.g., the NOC 160 as illustrated in FIGS. 3A-3C). The NOC may be configured as an intermediary device that enables communications between the control unit 110 and the server system 140. For example, the NOC can be a monitoring station that is configured to collect monitoring system data associated with monitoring systems of properties that are located within a specified geographic region (e.g., a locality, municipality, jurisdiction, etc.). In such implementations, the NOC receives, processes, and routes the supervision signals that are exchanged between the control unit 110 and the server system 140.

In some implementations, the server system 140 may be associated with multiple NOCs that each obtain and manage data from different geographic regions. For instance, each NOC may obtain and aggregate monitoring system data from properties that are located within an assigned geographic region. The server system 140 can then obtain data from multiple NOCs to aggregate monitoring system data associated with different geographic regions. In such implementations, the hierarchal architecture of the system can be used to obtain various types of status information (e.g., property-specific status, region-specific status, etc.), which can then be used to adjust the pinging frequencies across multiple properties.

FIG. 2 illustrates an example of a process 200 for adjusting a pinging frequency of a monitoring system. Briefly, the process 200 can include obtaining data associated with a monitoring system that monitors a property (210), determining a monitoring system status (220), determining a particular pinging frequency for the monitoring system (230), and transmitting an instruction to adjust the current pinging frequency to the particular pinging frequency (240).

In general, although the operations of the process 200 are discussed below in reference to the system 100, the operations of can also be performed by any monitoring system that includes a control unit located within a property and an associated server system that exchanges data communications with the control unit. In some implementations, the operations of the process 200 are performed by a single component of the system 100, such as the control unit 110, the server system 140, or the NOC 150. For example, the server system 140 can determine a status for the system 100 based on data collected by the sensors 122, adjusting a pinging frequency of the system 100 based on the determined status, and configure the control unit 110 to provide data communications according to the adjusted pinging frequency. In other implementations, the operations of the process 200 are performed by multiple components of the system 100. For example, the control unit 110 can obtain sensor data collected by the sensors 122 and determine a status for the system 100 based on the obtained sensor data. In this example, the control unit 110 provides an indication of the determined status of the system 100 to the server system 140 and/or the NOC 150, which then adjust the pinging frequency of the system 100 based on the status determined by the control unit 110. The descriptions below reference to operations of the process 200 being performed by the server system 140 for simplicity and brevity.

In more detail, the process 200 can include obtaining data associated with a monitoring system that monitors a property (210). For instance, the server system 140 may obtain data associated with a monitoring system that monitors the property 101. The obtained data can include sensor data collected by the sensors 122, data associated with and/or collected by the appliances 124, or data collected by the control unit 110. In some implementations, the obtained data may initially be collected by the control unit 110 over the network 105, and then transmitted to the server system 140 over a wide area network.

As described above with respect to FIG. 1, the obtained data can include various types of data that indicates a present condition of the property 101. For example, the obtained data can include occupancy data, presence data, network connectivity data, alarm condition data, appliance usage data, user activity data, among other types of data.

The process 200 can include determining a monitoring system status (220). For instance, the server system 140 may process the obtained data to determine a monitoring system status for the property 101. As described above, a monitoring system status can represent a present condition associated with a property (e.g., occupancy), and/or a configuration associated with a monitoring system of the property (e.g., a security status associated with a monitoring system).

In some implementations, the server system 140 may determine multiple statuses that each correspond to a different aspect or attribute associated with the property 101. For example, as shown in FIG. 1, the server system 140 may determine a status relating to occupancy, a status relating to power availability at nearby properties, a status relating to user configuration data of the monitoring system, among others. In addition, the server system 140 may also determine a status for the occurrence of a set of designated events that relate to monitoring operations at the property 101 (e.g., a detected security breach, a detected water line leak, a detected power outage, etc.).

The process 200 can include determining a particular pinging frequency for the monitoring system (230). For instance, the server system 140 may determine a pinging frequency for the monitoring system of the property 101 based on the monitoring system status determined in step 220. As illustrated in FIG. 1, the server system 140 may select an appropriate pinging frequency that corresponds to the status for the determined monitoring system status within the repository 142.

In some instances, if the repository 142 does not include a corresponding status for the determined status, the server system 140 may either select the closest system status within the repository 142, or estimate a pinging frequency based on various monitoring attributes indicated by the obtained monitoring system data. As examples, such attributes can include an alarm status associated with the property 101, a minimum data transmission frequency for collected sensor data, or a determined likelihood for a detected property condition event to be a life-critical condition.

The process 200 can include transmitting an instruction to adjust the current pinging frequency to the particular pinging frequency (240). For instance, the server system 140 may transmit an instruction to the control unit 110 to adjusts its pinging frequency to the pinging frequency determined in step 230. In some implementations where the system 100 also includes a NOC, the server system 140 may additionally transmit an instruction to the NOC to similarly adjust its pinging frequency.

As discussed above, the status of the property 101 can represent various aspects relating to monitoring operations performed by the server system 140. The status can be used to represent changes in present circumstances at the property 101 that may impact the frequency by which the control unit 110 and the server system 140 exchange data communications.

In one example, the status of the system 100 is determined by determining that the property 101 is presently occupied. In this example, the process 200 can be used to increase the frequency of communications between the control unit 110 and the server system 140 during time periods when the user 102 occupies the property 101, and reduce the frequency of communications when the property 101 is unoccupied (and therefore represents a lower risk to the user 102). The server system 140 can adjust the pinging frequency by reducing the time period between communications between the server system 140 and the control unit 110.

In another example, the status of the system 100 is determined by determining that the determining that a security system of the property 101 is has been armed. In this example, the process 200 can be used to reduce the risk associated with a potential security breach at the property 101 by increasing the frequency of communications between the control unit 110 and the server system 140. The server system 140 can adjust the pinging frequency by reducing the time period between communications between the server system 140 and the control unit 110.

In yet another example, the status of the system 100 is determined by determining an occurrence of an emergency condition at the property 101. Examples of emergency conditions include a power outage detected at the property 101, an alarm triggered at the property 101, among others. The server system 140 can adjust the pinging frequency by reducing the time period between communications between the server system 140 and the control unit 110.

In some implementations, the server system 140 adjusts the pinging frequency, as discussed above, by selecting an appropriate pinging frequency from among multiple pinging frequencies that are specified in a repository. The repository can specify multiple predetermined statuses for the system 100, and a different pinging frequency for each status specified in the repository. For example, the repository can specify a first status indicating that the property 101 is occupied and a corresponding pinging frequency of one hour, and a second status indicating that the property 101 is unoccupied and a corresponding pinging frequency of six hours. In such implementations, the server system 140 can match a present status determined for the system 100 to one of the predetermined statuses specified within the repository. In response, the server system 140 can select a particular pinging frequency corresponding to the matching status as the adjusted pinging frequency.

Figure 4:
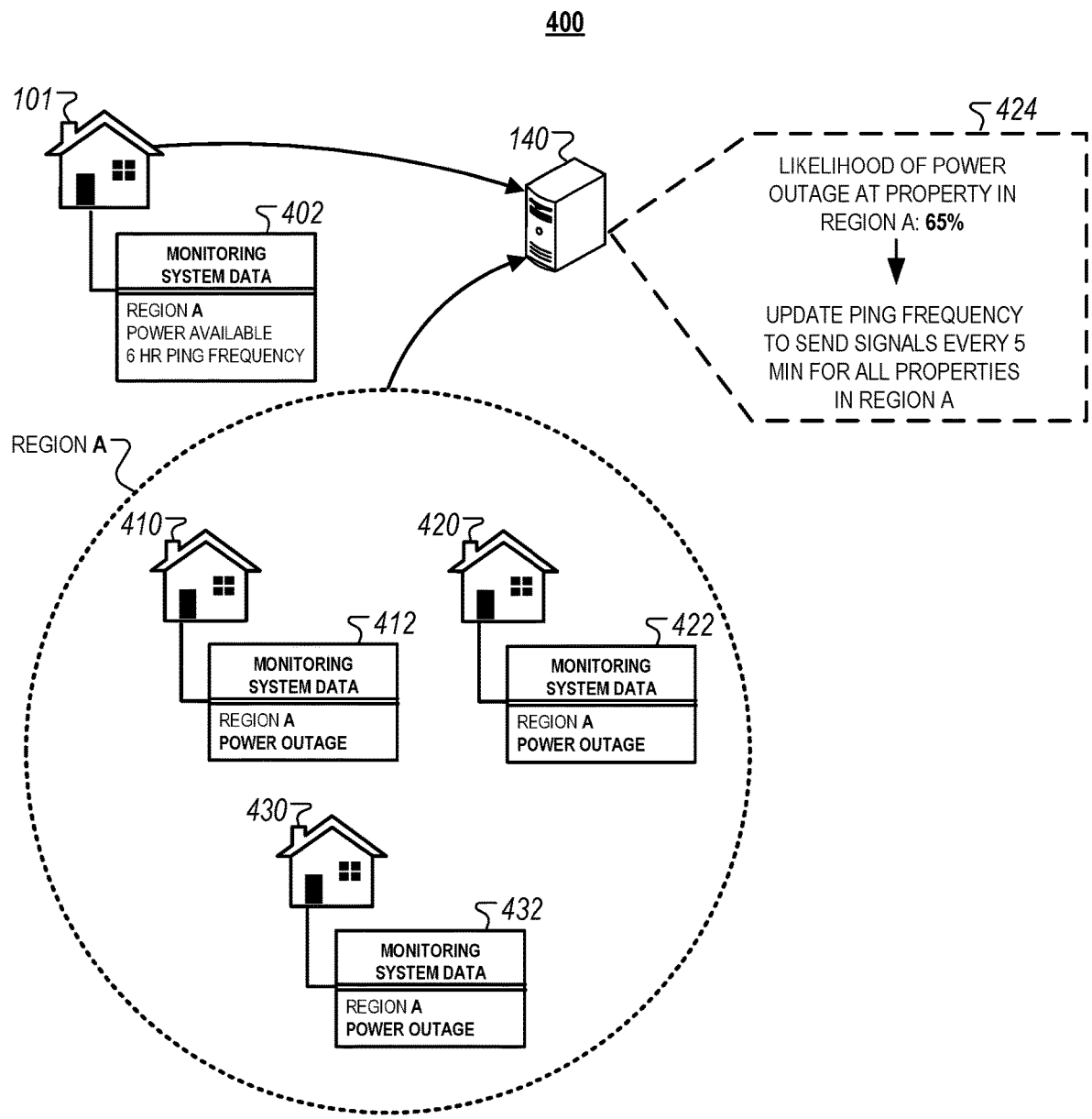
FIG. 4 illustrates an example of a system that adjusts a pinging frequency based on aggregated monitoring system data from multiple properties within a geographic region.

In some implementations, the server system 140 is configured to obtain data indicating statuses determined for monitoring systems of properties that are located in a geographic region that includes the property 101. For example, as depicted in FIG. 4 and discussed in detail below, the server system 140 can monitor statuses for properties 410, 420, and 430 that are located in the same geographic region as a property that includes the property 101. In this example, the server system 140 can monitor the statuses for the monitoring systems of the properties 410, 420, and 430 to determine when a change to a status has occurred. In some instances, a changed status for one the monitoring systems in the geographic region of the property 101 can be used to set the status of the system 100 to the same status that has been recently changed.

In some implementations, where the server system 140 monitors statuses of multiple monitoring systems of properties located in a geographical region, the server system 140 can monitor for the occurrence of an alarm event at one of the multiple properties. In such implementations, if an alarm event is detected at a property in the geographic region that includes the property 101, then the server system 140 can adjust the pinging frequency of the system 100 in response to the detected alarm event. For example, if a nearby property has been burglarized, then the server system 140 reduces the pinging frequency of the system 100 because of a higher likelihood that the property 101 may also be burglarized given its proximity to the property that has recently been burglarized. In this example, the server system 140 can adjust the status of the system 100 by providing an instruction to the control unit 110 to set a status that matches the status of the nearby property that has recently been burglarized.

In some implementations, the control unit 110 can alternatively adjust the pinging frequency of the system 100 as an alternative to the server system 140. For example, the control unit 110 can adjust the pinging frequency of the system 100 based on the status of the system 100 and then provide an indication of the adjusted pinging frequency to the server system 140. In such implementations, upon receiving the indication from the control unit 110, the server system 140 can then exchange communications with the control unit 110 according to the adjusted pinging frequency.

In some implementations, the control unit 110 is configured to determine a status of the property 101 based on historical usage patterns of the property 101. The control unit 110 can monitor and/or track energy usage patterns, device usage patterns, activity patterns, among other types of patterns relating to how residents use and/or occupy the property 101. The control unit 110 can then be configured to determine a status based on predicting present circumstances in the property 101 based on the historical patterns. As an example, if the historical energy usage patterns indicates that appliances in the property 101 are frequently used daily between 1 PM to 3 PM, the control unit 110 can determine, during this time period, a status indicating that the property is occupied. This status can then be used to increase the pinging frequency so that the control unit 110 more frequently communicates with the server system 140. In other examples, other types of historical data can be used, such as historical alarm events, historical occupancy patterns, historical activity patterns, etc. In such examples, the control unit 110 can automatically predict a status for the system 100 without processing sensor data collected by the sensors 132 in order to identify present conditions at the property 101.

In some implementations, the control unit 110 can adjust pinging frequency of the system 100 based on determining that a sensor from among the sensors 122 is not operational. For example, the control unit 110 can determine that a sensor is not operational if the collected sensor data does not include data collected by the non-operational sensor, or if the transmitted sensor data indicates an error associated with the non-operational sensor. In this example, the control unit 110 can be configured to adjust the pinging frequency by increasing the pinging frequency so that server system 100 more frequently monitors data received from the control unit 110. In some instances, the change in the pinging frequency can be used to reduce the likelihood of an emergency condition at the property due to a non-operational sensor. For example, the pinging frequency can be increased in response to determining that a carbon monoxide sensor is not operational so that the server system 140 can more closely monitor data collected by the system 100 to prevent carbon monoxide poisoning in the property 101.

In some implementations, the server system 140 can be configured to monitor sensor data collected by sensors of monitoring systems of other properties that are location in the same geographic region as the property 101. In some instance, the server system 140 can monitor the sensor data to determine that a sensor of a monitoring system in a nearby property is not operational. In such instances, the server system 140 can increase pinging frequency of the system 100 in response to the determination. For example, if a property that is located on the same street as the property 101 is detected to have a broken environmental sensor due to present weather conditions, then the server system 140 can increase the pinging frequency of the system 100 due to an increased likelihood that environmental sensors of the property 101 may also be susceptible to damage in the same weather conditions.

FIGS. 3A-3C illustrates examples of respective transmission sequences 300A-300C for adjusting a pinging frequency of a monitoring system. Referring initially to FIG. 3A, a pinging frequency of a monitoring system (e.g., the system 100) is adjusted using the transmission sequence 300A. In this example, the adjustment to the pinging frequency is primarily performed locally by the control unit 110 based on monitoring system data obtained from a particular property (e.g., the property 101). In particular, the control unit 110 uses the transmission sequence 300A to adjust the pinging frequency in response to changes in a monitoring state at the property 101. For example, such changes can include a detected loss of power at the property 101, a detection of a threshold number of sensor events at the property 101, a time of day, or a present monitoring state of a security panel (e.g., "ARMED" or "DISARMED").

The transmission sequence 300A initially includes the control unit 110 receiving monitoring system data, determining a monitoring system status, determining a new ping frequency for the monitoring system, adjusting a monitoring system configuration, and transmitting an instruction to adjust a current pinging frequency (310). In this example, the control unit 110 processes the received monitoring system data (e.g., sensor data collected by the sensors 122, data collected by the appliances 124, user input data received on the user device 130, etc.) and determines a monitoring system status using the techniques described above. The control unit 110 determines an appropriate pinging frequency based on a locally stored repository that maps status information to a corresponding pinging frequency. The control unit 110 then adjusts its configuration to the selected pinging frequency, and transmits an instruction that includes the selected pinging frequency to the NOC 160.

The NOC 160 adjusts the monitoring system configuration and forwards the instruction received from the control unit 110 to the server system 140 (320). In this example, the NOC 160 operates as a routing device that mediates communications between the control unit 110 and the server system 140 as described above. In particular, the NOC 160 can process and/or aggregate the monitoring system data received by the control unit 110 of a particular property (e.g., the property 101) in relation to data collected by control units of other nearby properties that are located in the same geographic region as the particular property. The NOC 160 may use various pattern recognition and/or learning techniques to identify occurrences of events within the geographic region that may impact the monitoring of the particular property.

In some implementations, the data aggregated by the NOC 160 may reflect a condition that requires a shorter pinging frequency than the pinging frequency indicated by the instruction from the control unit 110 (e.g., based on a detected occurrence of an event at multiple nearby properties within a geographic region). In such implementations, the NOC 160 may either adjust the pinging frequency included in the instruction and transmit the adjusted instruction to the control unit 110 and the server system 140, or transmit a signal back to the control unit 110 to select a new pinging frequency to reflect the data aggregated by the NOC 160.

The server system 140 obtains the instruction from the NOC 160 and then adjusts the monitoring system configuration (330). In this example, the server system 140 adjusts its configured pinging frequency to match the pinging frequency selected by the control unit 110 or adjusted by the NOC 160. In some implementations, the server system 140 may process the monitoring system data received by the control unit 110 along with other types of global configuration data. For example, the server system 140 may decrease the pinging frequency for multiple properties (including the property 101) if the number of overall incoming transmissions are above a specified threshold number that potentially overloads the processing and/or storage capabilities of the server system 140.

Once the server system 140 has adjusted its configuration, the server system 140 transmits an acknowledgement to the NOC 160, which routes the acknowledgement to the control unit 110 (340). The acknowledgement enables the control unit 110 and the NOC 160 to determine when the server system 140 has adjusted its pinging frequency, and in response, begins transmits supervision signals according to the newly adjusted pinging frequency.

Referring now to FIG. 3B, a pinging frequency of the system 100 is adjusted using the transmission sequence 300B. In this example, the adjustment to the pinging frequency is primarily performed remotely by the NOC 160 based on data obtained from multiple monitoring systems of properties that are located within a particular geographic region. In particular, the NOC 160 can use the transmission sequence 300B to adjust the pinging frequency in response to changes in external conditions that can impact multiple properties. For example, such changes can include a detected widespread power outage in the particular geographic region, the appearance and/or disappearance of non-communicating monitoring systems near a vicinity of particular property, or configuration adjustments to the NOC 160 that are provided by an authorized dealer that provides monitoring services to multiple properties (e.g., a security provider).

The transmission sequence 300B initially includes the control unit 110 receiving monitoring system data, and transmitting the monitoring system data to the NOC 160 (312). In this example, the control unit may obtain and process data in a similar manner as described above with respect to step 310 of the transmission sequence 300A. For example, the received data can include sensor data collected by the sensors 122, data collected by the appliances 124, user input data received on the user device 130, among others.

The NOC 160 processes the received monitoring system data, determines a monitoring system status, determines a new ping frequency for the monitoring system, adjusts a monitoring system configuration, and transmitting an instruction to adjust a current pinging frequency to (322). In this example, the NOC 160 may perform operations in a similar manner as described above with respect to steps 310 and 320 of the transmission sequence 300A. For example, the NOC 160 may process the monitoring system data received at the control unit 110 in relation to data collected from monitoring systems of nearby properties that are location within a specific geographic region. The NOC 160 can identify a change in the monitoring state of one or more nearby properties, and then determine an appropriate pinging frequency to reflect the changed monitoring state.

As described above, if there is a detected widespread power outage in the geographic region, the NOC 160 may determine that the property 101 may also experience a similar power outage. As a result, the NOC 160 may increase the pinging frequency of the control unit 110 with the server system 140 to increase the number of supervision signals that are subsequently exchanged between the control unit 110 and the server system 140.

The server system 140 obtains the instruction from the NOC 160 and then adjusts the monitoring system configuration (332). In this example, the server system 140 adjusts its configured pinging frequency in a manner similar to descriptions above with respect to step 330. The server system 140 then transmits an acknowledgement to the NOC 160, which then routes the acknowledgement to the control unit (342). In this example, the server system 140 transmits the acknowledgement in a manner similar to the descriptions above with respect to step (340).

The control unit 110 receives the acknowledgement from the NOC 160 and in response, adjusts its configured pinging frequency to the new pinging frequency selected by the NOC 160 in step 322 (352). As described above, once adjusted, the control unit 110 exchanges supervision signals with the server system 140 accordingly to the newly configured pinging frequency.

Referring now to FIG. 3C, a pinging frequency of the system 100 is adjusted using the transmission sequence 300C. In this example, the adjustment to the pinging frequency is primarily performed remotely by the server system 140 based on data obtained from a network of monitoring systems of properties that are located in different geographic regions. In particular, the server system 140 can use the transmission sequence 300C to adjust the pinging frequency in response to changes in network bandwidth or the changes in the overall number of incoming data transmissions to the server system 140. For example, such changes can include network data indicating failure and/or overload of control units of properties in different regions (i.e., indicating a potential network failure), a number of incoming transmissions to the server system 140 exceeding a predetermined threshold number, or limited storage and/or processing capabilities of the server system 140 due to a high number of incoming data transmissions.

The transmission 300C initially includes the control unit 110 receiving monitoring system data, and transmitting the monitoring system data to the NOC 160 (314). In this example, the control unit may obtain and process data in a similar manner as described above with respect to step 310 of the transmission sequence 300A. For example, the received data can include sensor data collected by the sensors 122, data collected by the appliances 124, user input data received on the user device 130, among others.

The NOC 160 routes the received monitoring system data to the server system 140 (324). In this example, the NOC 160 can operate as a passive routing device that monitors and manages data communications between the control unit 110 and the server system 140. As described above, the NOC 160 may simply forward the received data from the control unit 110 to the server system 140 without significant processing the received data. Alternatively, in other implementations, the NOC 160 may process and/or package the data collected by the control unit 110 and transmit the packaged data to the server system 140.

The server system 140 processes the received monitoring system data, determines a monitoring system status, determines a new ping frequency for the monitoring system, adjusts a monitoring system configuration, and transmitting an instruction to adjust a current pinging frequency to (334). In this example, the server system 140 may perform operations in a similar manner as described above with respect to steps 310 and 320 of the transmission sequence 300A. For example, the server system 140 may process the monitoring system data received at the control unit 110 in relation to network data that indicates, for example, a latency associated with incoming data transmissions over a monitoring network, a bandwidth for the monitoring network, and/or resource availability at the server system 140 to process incoming data transmissions.

As described above, if the server system 140 is presently overloaded and unable to process any newly incoming data transmissions from control units over the monitoring network, the server system 140 may determine that incoming data transmissions may be unable to be presently processed. As a result, the server system 140 may reduce the pinging frequency for all control units connected over the monitoring network to reduce the number of incoming transmissions and/or increase the bandwidth availability over the monitor network for potential life-critical events. The server system 140 then generates an instruction to change the pinging frequency and transmits the instruction to the NOC 160.

The NOC 160 obtains the instructions from the server system 140, adjusts the monitoring system configuration, and forwards the instruction to the control unit 110 (344). In this example, the NOC 160 may perform operations in a similar manner as described above with respected to steps 322 and 342. For example, the NOC 160 adjusts its pinging frequency to the new pinging frequency selected by the server system 140 and indicated by the received instruction.

The control unit 110 receives the instruction from the NOC 160 and in response, adjusts its configured pinging frequency to the new pinging frequency selected by the server system in step 334 (354). As described above, once adjusted, the control unit 110 exchanges supervision signals with the server system 140 accordingly to the newly configured pinging frequency.

FIG. 4 illustrates an example of a system 400 that adjusts a pinging frequency based on aggregated monitoring system data from multiple properties within a geographic region. In the example, the central monitoring server 140 obtains monitoring system data 402 from a control unit associated with the property 101 (e.g., the control unit 110). As described above, the monitoring system data 402 can identify a geographic region where the property 101 is location (e.g., "REGION A"), a determined status for the monitoring system of property 101 (e.g., "POWER AVAILABLE"), and a present pinging frequency of the monitoring system (e.g., "6 HRS").

The server system 140 also obtains data from control units of other monitoring systems that are associated with properties that are determined to be nearby the property 101. For example, the server system 140 obtains monitoring system data 412, 422, and 432 from respective control units that are located in properties 410, 420, and 430, which are all located within the same region as the property 101 (e.g., "REGION A"). As depicted, in this example, the monitoring system data 412, 422, and 432 indicate that control units have detected power outages at the corresponding properties 410, 420, and 430.

The server system 140 processes the monitoring system data 402 in relation to the monitoring system data 412, 422, and 432 in order to make a determination that there is a high likelihood that the property 101 may experience a similar power outage. This determination can be based on using pattern recognition analysis based on the information included within the monitoring system data 412, 422, and 432. As an example, the server system 140 determines that there is a 65% likelihood that any given property within the REGION A will also lose power. Based on this determination, the server system 140 also determines that there may be a high likelihood of an emergency condition subsequently occurring at any given property within the REGION A due to a potential power outage.

In response, the server system 140 determines to increase the ping frequency from "6 HRS," as currently configured for the monitoring system at the property 101, to "5 MIN" to increase the amount of incoming data from monitoring systems located within the REGION A. This adjustment can then be used to improve the supervision of the monitoring systems during a vulnerable time period (e.g., high susceptibility to a power outage).

In some implementations where a monitoring system additionally includes a NOC (e.g., the NOC 160), the techniques described above and illustrated in FIG. 4 can be performed additionally or alternatively by the NOC 160. For example, an NOC may be assigned to a specified geographic region and multiple NOCs may be associated with the server system 140. In this example, the NOC 160 may perform region-specific monitoring operations (e.g., operations relating to monitoring systems of properties located within a shared geographic region) whereas the server system 140 may perform network-based monitoring operations (e.g., operations relating to all monitoring systems of properties that are associated with the same service provider and/or service network). In this regard, the hierarchal monitoring operations performed by multiple NOC and the server system 140 can be used to assess different types of conditions that may potentially adjust the monitoring system status of a monitoring system at any given property.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed application-specific integrated circuits (ASICs).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

The invention claimed is:

1. A monitoring system that is configured to monitor a property, the monitoring system comprising:
   one or more sensors that are located throughout the property and that are configured to generate sensor data;
   a control unit that is configured to receive, from the one or more sensors, the sensor data; and
   a server system that is configured to communicate with the control unit according to a pinging frequency that specifies a time period between communications between the server system and the control unit,
   wherein the control unit is configured to:
      determine a status of the property based on the sensor data; and
      transmit, to the server system, data indicating the status of the property, and
   wherein the server system is configured to:
      access a repository that specifies (i) multiple statuses for the property, and (ii) a different pinging frequency for each status included in the multiple statuses;
      determine that a particular status within the repository matches the status of the monitoring system; and
      adjust the pinging frequency to match a particular pinging frequency corresponding to the particular status;
      communicate with the control unit according to the pinging frequency that was adjusted.

2. The monitoring system of claim 1, wherein:
   the control unit is configured to determine the status of the property based on the sensor data by determining that the property is presently occupied; and
   the server system is configured to adjust the pinging frequency based on the status of the property by reducing a frequency of communications between the server system and the control unit in response to determining that the property is presently occupied.

3. The monitoring system of claim 1, wherein:
   the control unit is configured to determine the status of the property based on the sensor data by determining that a security system of the property is has been armed; and
   the server system is configured to adjust the pinging frequency based on the status of the property by increasing a frequency of communications between the server system and the control unit in response to determining that the security system of the property is has been armed.

4. The monitoring system of claim 1, wherein:
   the control unit is configured to determine the status of the property based on the sensor data by determining an occurrence of an emergency condition at the property; and
   the server system is configured to adjust the pinging frequency based on the status of the property by increasing a frequency of communications between the server system and the control unit in response to determining the occurrence of the emergency condition at the property.

5. The monitoring system of claim 4, wherein the emergency condition at the property comprises a power outage detected at the property.

6. The monitoring system of claim 1, wherein the server system is configured to:
   obtain data indicating statuses determined for monitoring systems of properties that are located in a geographic region that includes the property; and
   determine that a particular status for a particular property from among the properties that are located in a geographic region has recently been changed.

7. The monitoring system of claim 6, wherein the server system is configured to:
   determine that the particular status for the particular property has recently been changed by identifying an occurrence of an alarm event at the particular property; and
   adjust the pinging frequency by increasing a frequency of communications between the server system and the control unit in response to identifying the occurrence of the alarm event at the particular property.

8. The monitoring system of claim 7, wherein the server system is configured to provide an instruction to the control unit that, when received by the control unit, causes the control unit to determine the status of the property by setting the particular status for the particular property as the status of the property.

9. The monitoring system of claim 1, wherein the control unit is configured to:
   readjust the pinging frequency that was adjusted based on an updated status of the property; and
   provide an indication of the pinging frequency that was readjusted to the server system.

10. The monitoring system of claim 1, wherein the control unit is configured to determine the status of the property based on historical usage patterns of the property by a resident of the property.

11. The monitoring system of claim 1, wherein the communications between the server system and the control unit comprises an indication that the control unit is operational.

12. The monitoring system of claim 1, wherein the control unit is configured to:
   determine, based on the sensor data, that a particular sensor from among the one or more sensors is not operational; and
   transmit, to the server system, data indicating the status of the property by transmitting data indicating that the particular sensor is not operational, and
   the server system is configured to:
   adjust the pinging frequency based on the status of the property by reducing the time period between communications between the server system and the control unit based on the data indicating that the particular sensor is not operational.

13. The monitoring system of claim 1, wherein the server system is configured to:
   receive data indicating that a sensor of a monitoring system of a particular property that is located in a geographic region that includes the property is not operational; and
   adjust the pinging frequency based further on the sensor of the monitoring system of the particular property that is located in the geographic region that includes the property is not operational by increasing a frequency of communications between the server system and the control unit.

14. A method comprising:
   obtaining, by a monitoring system that is configured to monitor a property and that includes a control unit and a server system, sensor data generated by one or more sensors of the monitoring system;
   determining, by the monitoring system, a status of the property based on the sensor data;

accessing, by the monitoring system, a repository that specifies (i) multiple statuses for the property, and (ii) a different pinging frequency for each status included in the multiple statuses;

determining, by the monitoring system, that a particular status within the repository matches the status of the monitoring system;

adjusting, by the monitoring system, a pinging frequency of the monitoring system to match a particular pinging frequency corresponding to the particular status; and configuring, by the monitoring system, the control unit to communicate with the server system according to the pinging frequency that was adjusted.

15. The method of claim 14, wherein:

determining the status of the property based on the sensor data comprises determining that the property is presently occupied; and adjusting the pinging frequency based on the status of the property comprises reducing a frequency of communications between the server system and the control unit in response to determining that the property is presently occupied.

16. The system of claim 14, wherein:

determining the status of the property based on the sensor data comprises determining that a security system of the property is has been armed; and adjusting the pinging frequency based on the status of the property comprises increasing a frequency of communications between the server system and the control unit in response to determining that the security system of the property is has been armed.

17. The method of claim 14, wherein:

determining the status of the property based on the sensor data comprises determining an occurrence of an emergency condition at the property; and adjusting the pinging frequency based on the status of the property comprises increasing a frequency of communications between the server system and the control unit in response to determining the occurrence of the emergency condition at the property.

18. The method of claim 17, wherein the emergency condition at the property comprises a power outage detected at the property.

* * * * *